United States Patent
Adeleu et al.

(10) Patent No.: US 12,331,151 B2
(45) Date of Patent: Jun. 17, 2025

(54) METHOD FOR PREPARING A CROSS-LINKABLE COMPOSITION

(71) Applicant: BOSTIK SA, Colombes (FR)

(72) Inventors: François Adeleu, Venette (FR); Sylvana Dubois, Venette (FR)

(73) Assignee: BOSTIK SA, Colombes (FR)

( * ) Notice: Subject to any disclaimer, the term of this patent is extended or adjusted under 35 U.S.C. 154(b) by 569 days.

(21) Appl. No.: 17/600,228

(22) PCT Filed: Apr. 1, 2020

(86) PCT No.: PCT/EP2020/059274
§ 371 (c)(1),
(2) Date: Sep. 30, 2021

(87) PCT Pub. No.: WO2020/201364
PCT Pub. Date: Oct. 8, 2020

(65) Prior Publication Data
US 2022/0220245 A1    Jul. 14, 2022

(30) Foreign Application Priority Data
Apr. 4, 2019   (FR) ...................................... 1903604

(51) Int. Cl.
| | |
|---|---|
| *C08G 18/22* | (2006.01) |
| *C08G 18/10* | (2006.01) |
| *C08G 18/28* | (2006.01) |
| *C08G 18/48* | (2006.01) |
| *C08G 18/75* | (2006.01) |

(52) U.S. Cl.
CPC ............ *C08G 18/222* (2013.01); *C08G 18/10* (2013.01); *C08G 18/227* (2013.01); *C08G 18/289* (2013.01); *C08G 18/4825* (2013.01); *C08G 18/4866* (2013.01); *C08G 18/755* (2013.01); *C08G 2170/00* (2013.01); *C08G 2190/00* (2013.01)

(58) Field of Classification Search
CPC .... C08G 18/10; C08G 18/289; C08G 18/755; C08G 18/4866; C08G 18/4825; C08G 18/227; C08G 18/222
See application file for complete search history.

(56) References Cited

U.S. PATENT DOCUMENTS

| | | | | |
|---|---|---|---|---|
| 3,627,722 A | * | 12/1971 | Seiter | C09K 3/1021 |
| | | | | 528/48 |
| 5,587,448 A | * | 12/1996 | Engen | C08G 18/089 |
| | | | | 528/48 |
| 2013/0096252 A1 | * | 4/2013 | Vyakaranam | C08G 18/18 |
| | | | | 524/588 |
| 2017/0101564 A1 | * | 4/2017 | Choffat | C08G 18/6692 |
| 2018/0244828 A1 | * | 8/2018 | Goyal | C08G 18/755 |
| 2019/0092904 A1 | | 3/2019 | Fiedel | |

FOREIGN PATENT DOCUMENTS

| | | |
|---|---|---|
| CN | 106414537 A | 2/2017 |
| CN | 107922577 A | 4/2018 |
| EP | 2588510 A1 | 5/2013 |
| EP | 2886575 A1 | 6/2015 |
| WO | 2012003212 A1 | 1/2012 |
| WO | 2015185642 A1 | 12/2015 |
| WO | 2017044319 A1 | 3/2017 |

OTHER PUBLICATIONS

SA/EP; International Search Report and Written Opinion for International Patent Application No. PCT/EP2020/059274 dated May 19, 2020, 11 pages.

* cited by examiner

*Primary Examiner* — Michael L Leonard
(74) *Attorney, Agent, or Firm* — NK Patent Law

(57) ABSTRACT

A process for preparing a crosslinkable composition comprising at least one alkoxysilane-terminated silyl polymer P, and at least one catalytic system B comprises:
  a. preparing an alkoxysilane-terminated silyl polymer P comprising:
    a-1) the polyaddition reaction between a composition of polyol(s) and a composition of polyisocyanate(s), in the presence of a catalyst A chosen from carboxylates based on bismuth and/or zinc, in order to prepare an NCO-terminated polymer;
    a-2) the reaction of the NCO-terminated polymer obtained in step a-1) with an organosilane compound having at least one function that is reactive with the —NCO function of the NCO-terminated polymer; and
  b. bringing the silyl polymer P obtained in step a) into contact with a catalytic crosslinking system B which is a mixture of zinc-based carboxylate(s) and cyclic amidine. The process is carried out in the absence of a tin-based catalyst.

17 Claims, No Drawings

METHOD FOR PREPARING A CROSS-LINKABLE COMPOSITION

CROSS-REFERENCE TO RELATED APPLICATIONS

This application is a U.S. National Stage application of International Patent Application No. PCT/EP2020/059274, filed on Apr. 1, 2020, which claims the benefit of French Patent Application No. FR1903604, filed on Apr. 4, 2019.

FIELD OF THE INVENTION

The present invention relates to a process for preparing a crosslinkable composition.

The present invention also relates to the use of the composition as a sealant, coating or adhesive.

TECHNICAL BACKGROUND

Sealants are widely used in the construction field, in particular for assembling substrates, for example made of concrete or of steel, via expansion joints and for making it possible, by virtue of their mechanical and in particular elastic properties, to obtain a joint which is stable to the dimensional variations brought about in particular by changes in temperature.

Sealants include those obtained from compositions based on moisture-crosslinkable silyl polymers. The latter are commonly prepared by a process employing a step of polyaddition in the presence of tin-based catalyst, such as dioctyltin dilaurate (DOTL) or dibutyltin dilaurate (DBTL). However, these catalysts exhibit high toxicological risks for man and the environment.

Other processes for preparing compositions based on silyl polymers employ other catalysts. However, the use of catalysts other than tin-based catalysts have not made it possible to lead to crosslinked compositions that have mechanical and/or adhesive properties of the same order as those obtained with tin-based catalysts.

There is therefore a need for novel compositions based on silyl polymers which are more environmentally friendly and human friendly, and which exhibit in particular a good compromise between good mechanical properties and good adhesion properties.

There is in particular a need for new compositions which are more environmentally friendly and human friendly, and which have good elastic properties.

DESCRIPTION OF THE INVENTION

Process

The present invention relates to a process for preparing a crosslinkable composition comprising at least one alkoxysilane-terminated silyl polymer P, and at least one catalytic system B, said process comprising the following steps:
 a) preparing an alkoxysilane-terminated silyl polymer P comprising:
  a-1) the polyaddition reaction between a composition of polyol(s) and a composition of polyisocyanate(s), in the presence of a catalyst A chosen from carboxylates based on bismuth and/or zinc, in order to prepare an NCO-terminated polymer;
  a-2) the reaction of the NCO-terminated polymer obtained in step a-1) with an organosilane compound having at least one function that is reactive with the —NCO function of the NCO-terminated polymer;
 b) bringing the silyl polymer P obtained in step a) into contact with a catalytic crosslinking system B which is a mixture of zinc-based carboxylate(s) and cyclic amidine, said process being carried out in the absence of a tin-based catalyst.

According to the present invention, the term "organosilane" relates to compounds which on the one hand have at least one, preferably two or three, hydrolyzable groups, preferentially alkoxy or acyloxy groups, bonded directly to the Si atom via Si—O bonds, and on the other hand at least one organic radical bonded directly to the Si atom via an Si—C bond.

Step a-1)

The process according to the invention comprises a step a-1) which is a polyaddition reaction between a composition of polyol(s) and a composition of polyisocyanate(s), in the presence of a catalyst A chosen from carboxylates of bismuth and/or of zinc, in order to prepare an NCO-terminated polymer.

Polyol(s)

The abovementioned composition of polyol(s) can consist of a polyol or of a mixture of polyols.

The polyol(s) which can be used can be chosen from that (those) having a number-average molecular mass ranging from 200 g/mol to 20 000 g/mol, preferably from 400 g/mol to 18 000 g/mol.

The number-average molecular mass of the polyols can be calculated from the hydroxyl number (OHN), expressed in mg KOH/g, and from the functionality of the polyol or determined by methods well known to those skilled in the art, for example by size exclusion chromatography (or SEC) with PEG (polyethylene glycol) standard.

The polyols may have a hydroxyl functionality ranging from 2 to 6, preferably 2 to 3. In the context of the invention, and unless otherwise mentioned, the hydroxyl functionality of a polyol is the mean number of hydroxyl functions per mole of polyol.

The polyol(s) which can be used can be chosen from polyester polyols, polyether polyols, polydiene polyols, polycarbonate polyols, poly(ether-carbonate) polyols, OH-terminated prepolymers, and mixtures thereof.

The polyol(s) which can be used can be chosen from aromatic polyols, aliphatic polyols, carbonate polyols and the mixtures of these compounds.

According to the invention, the polyester polyol(s) can have a number-average molecular mass ranging from 1000 g/mol to 10 000 g/mol, preferably from 2000 g/mol to 6000 g/mol.

Among the polyester polyols, examples that may be mentioned include:
 polyester polyols of natural origin, such as castor oil;
 polyester polyols resulting from the condensation:
  of one or more aliphatic (linear, branched or cyclic) or aromatic polyols, such as, for example, ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine and mixtures thereof, with
  one or more polycarboxylic acids or an ester or anhydride derivative thereof, such as 1,6-hexanedioic acid, dodecanedioic acid, azelaic acid, sebacic acid, adipic acid, 1,18-octadecanedioic acid, phthalic acid, succinic acid and the mixtures of these acids, an unsaturated anhydride, such as, for example, maleic or phthalic anhydride, or a lactone, such as, for example, caprolactone.

The abovementioned polyester polyols can be prepared conventionally and are for the most part commercially available.

Mention may be made, among polyester polyols, for example, of the following products with a hydroxyl functionality equal to 2:

Tone® 0240 (sold by Union Carbide), which is a polycaprolactone with a number-average molecular mass of approximately 2000 g/mol and a melting point of approximately 50° C., Dynacoll® 7381 (sold by Evonik) with a number-average molecular mass of approximately 3500 g/mol and having a melting point of approximately 65° C., Dynacoll® 7360 (sold by Evonik), which results from the condensation of adipic acid with hexanediol and has a number-average molecular mass of approximately 3500 g/mol and a melting point of approximately 55° C., Dynacoll® 7330 (sold by Evonik) with a number-average molecular mass of approximately 3500 g/mol and having a melting point of approximately 85° C., Dynacoll® 7363 (sold by Evonik), which also results from the condensation of adipic acid with hexanediol and has a number-average molecular mass of approximately 5500 g/mol and a melting point of approximately 57° C., Dynacoll® 7250 (sold by Evonik): polyester polyol having a viscosity of 180 Pa·s at 23° C., a number-average molecular mass Mn equal to 5500 g/mol and a $T_g$ equal to −50° C., Kuraray® P-6010 (sold by Kuraray): polyester polyol having a viscosity of 68 Pa·s at 23° C., a number-average molecular mass equal to 6000 g/mol and a $T_g$ equal to −64° C., Kuraray® P-10010 (sold by Kuraray): polyester polyol having a viscosity of 687 Pa·s at 23° C. and a number-average molecular mass equal to 10 000 g/mol.

According to a preferred embodiment, the polyester polyol is chosen from: a polycaprolactone; castor oil; a polyester polyol resulting from the condensation of ethylene glycol, propylene glycol, 1,3-propanediol and/or 1,6-hexanediol with adipic acid and/or the various isomers of phthalic acid; and mixtures thereof.

According to the invention, the polyether polyol(s) may have a number-average molecular mass ranging from 200 g/mol to 20 000 g/mol, preferably from 400 g/mol to 18 000 g/mol.

Preferably, the polyether polyol(s) has (have) a hydroxyl functionality ranging from 2 to 3.

The polyether polyol(s) which can be used according to the invention is (are) preferably chosen from polyoxyalkylene polyols, the linear or branched alkylene part of which comprises from 1 to 4 carbon atoms, preferably from 2 to 3 carbon atoms.

More preferentially, the polyether polyol(s) which can be used according to the invention is (are) preferably chosen from polyoxyalkylene diols or polyoxyalkylene triols and better still polyoxyalkylene diols, the linear or branched alkylene part of which comprises from 1 to 4 carbon atoms, preferably from 2 to 3 carbon atoms.

As examples of polyoxyalkylene diols or triols that can be used according to the invention, mention may for example be made of:

polyoxypropylene diol or triol (also denoted by polypropylene glycol (PPG) diol or triol) having a number-average molecular mass ranging from 400 g/mol to 18 000 g/mol and preferably ranging from 400 g/mol to 12 000 g/mol, polyoxyethylene diol or triol (also denoted by polyethylene glycol (PEG) diol or triol) having a number-average molecular mass ranging from 400 g/mol to 18 000 g/mol and preferably ranging from 400 g/mol to 12 000 g/mol, polyoxybutylene glycol (also denoted by polybutylene glycol (PBG) diol or triol) having a number-average molecular mass ranging from 200 g/mol to 12 000 g/mol, PPG/PEG/PBG copolymer or terpolymer diol or triol having a number-average molecular mass ranging from 400 g/mol to 18 000 g/mol and preferably ranging from 400 g/mol to 12 000 g/mol, polytetrahydrofuran (PolyTHF) diol or triol having a number-average molecular mass ranging from 250 g/mol to 12 000 g/mol, polytetramethylene glycols (PTMG) having a number-average molecular mass ranging from 200 g/mol to 12 000 g/mol, and mixtures thereof.

Preferably, the polyether polyol(s) which can be used is (are) chosen from polyoxypropylene diols or triols. The polyether polyols mentioned above can be prepared conventionally and are widely available commercially. They can, for example, be obtained by polymerization of the corresponding alkylene oxide in the presence of a catalyst based on a double metal/cyanide complex.

Mention may be made, as examples of polyether diols, of the polyoxypropylene diols sold under the name Acclaim® by Covestro, such as Acclaim® 12200, with a number-average molecular mass in the vicinity of 11 335 g/mol, Acclaim® 8200, with a number-average molecular mass in the vicinity of 8057 g/mol, and Acclaim® 4200, with a number-average molecular mass in the vicinity of 4020 g/mol, or else of the polyoxypropylene diol sold under the name Voranol P2000 by Dow, with a number-average molecular mass in the vicinity of 2004 g/mol.

Mention may be made, as an example of polyether triols, of the polyoxypropylene triol sold under the name Voranol CP3355 by Dow, with a number-average molecular mass in the vicinity of 3554 g/mol.

The polydiene polyol(s) which can be used according to the invention may preferably be chosen from polydienes comprising hydroxyl end groups, and the corresponding hydrogenated or epoxidized derivatives thereof.

Preferably, the polydiene polyol(s) which can be used according to the invention is (are) chosen from polybutadienes including hydroxyl end groups, which are optionally hydrogenated or epoxidized. Preferentially, the polydiene polyol(s) which can be used according to the invention is (are) chosen from butadiene homopolymers and copolymers comprising hydroxyl end groups, which are optionally hydrogenated or epoxidized.

In the context of the invention, and unless otherwise indicated, the term "hydroxyl end groups" of a polydiene polyol is understood to mean the hydroxyl groups located at the ends of the main chain of the polydiene polyol.

The abovementioned hydrogenated derivatives can be obtained by complete or partial hydrogenation of the double bonds of a polydiene comprising hydroxyl end groups, and are thus saturated or unsaturated.

The epoxidized derivatives mentioned above can be obtained by chemoselective epoxidation of the double bonds of the main chain of a polydiene comprising hydroxyl end groups, and thus comprise at least one epoxy group in its main chain.

Mention may be made, as examples of polybutadiene polyols, of saturated or unsaturated butadiene homopolymers comprising hydroxyl end groups, which are optionally epoxidized, such as, for example, those sold under the name Poly BD® or Krasol® by Cray Valley.

Mention may be made, as examples of polycarbonate diol, of Converge Polyol 212-10 and Converge Polyol 212-20 sold by Novomer, respectively with number-average molecular masses (Mn) equal to 1000 and 2000 g/mol, the hydroxyl numbers of which are respectively 112 and 56 mg KOH/g, Desmophen® C XP 2716 sold by Covestro, with a number-average molecular mass (Mn) equal to 326 g/mol, the hydroxyl number of which is 344 mg KOH/g, and Polyol C-590, C-1090, C-2090 and C-3090 sold by Kuraray, having a number-average molecular mass (Mn) ranging from 500 to 3000 g/mol and a hydroxyl number ranging from 224 to 37 mg KOH/g.

Preferably, the composition of polyol(s) consists of one or more polyols chosen from those mentioned above and mixtures thereof. In particular, the composition of polyol(s) can consist of one or more polyols, including at least one polyether polyol. More particularly, the composition of polyol(s) can consist of one or more polyether polyols.

Polyisocyanate(s)

In the context of the invention, the term "polyisocyanate" is understood to mean a compound comprising at least two isocyanate (NCO) groups.

The abovementioned composition of polyisocyanate(s) can consist of one polyisocyanate or of a mixture of polyisocyanates.

The polyisocyanate(s) which can be used can be chosen from those typically used in the synthesis of an NCO-terminated polyurethane.

The polyisocyanate(s) which can be used can be aliphatic (linear or branched) or aromatic, and optionally substituted.

Preferably, the polyisocyanate(s) is (are) chosen from diisocyanates, triisocyanates and mixtures thereof.

According to a preferred embodiment, the polyisocyanate(s) is (are) chosen from the group consisting of pentamethylene diisocyanate (PDI), hexamethylene diisocyanate (HDI), heptane diisocyanate, octane diisocyanate, nonane diisocyanate, decane diisocyanate, undecane diisocyanate, dodecane diisocyanate, isophorone diisocyanate (IPDI), norbornane diisocyanate, norbornene diisocyanate, 1,4-cyclohexane diisocyanate (CNDI), methylcyclohexane diisocyanate, ethylcyclohexane diisocyanate, propylcyclohexane diisocyanate, methyldiethylcyclohexane diisocyanate, cyclohexanedimethylene diisocyanate, 1,5-diisocyanato-2-methylpentane (MPDI), 1,6-diisocyanato-2,4,4-trimethylhexane, 1,6-diisocyanato-2,2,4-trimethylhexane (TMDI), 4-isocyanatomethyl-1,8-octane diisocyanate (TIN), 2,5-bis(isocyanatomethyl)bicyclo[2.2.1]heptane (2,5-NBDI), 2,6-bis(isocyanatomethyl)bicyclo[2.2.1]heptane (2,6-NBDI), 1,3-bis(isocyanatomethyl)cyclohexane (1,3-H6-XDI), 1,4-bis(isocyanatomethyl)cyclohexane (1,4-H6-XDI), toluene diisocyanate (TDI), diphenylmethylene diisocyanate (MDI), dicyclohexylmethylene diisocyanate (H12-MDI), xylylene diisocyanate (XDI) (in particular meta-xylylene diisocyanate (m-XDI)) and mixtures thereof.

The MDI can be in the form of an isomer or of a mixture of isomers, such as 4,4'-MDI and/or 2,4'-MDI.

The TDI can be in the form of an isomer or of a mixture of isomers, such as 2,4-TDI and/or 2,6-TDI.

Preferably, the polyisocyanate is MDI and in particular 4,4'-MDI.

The polyisocyanate(s) which can be used to prepare the polyurethane used according to the invention are typically widely available commercially. By way of example, mention may be made of Scuranate® TX sold by Vencorex, corresponding to a 2,4-TDI with a purity of the order of 95%, Scuranate® T100 sold by Vencorex, corresponding to a 2,4-TDI with a purity of greater than 99% by weight, Desmodur® I sold by Covestro, corresponding to an IPDI, or else Isonate® M125 sold by Dow, corresponding to an MDI containing at least 97% by weight of the 4,4'-MDI isomer.

Preferably, the polyisocyanate composition comprises IPDI.

In the context of the invention, the expressions "polyaddition reaction" and "polyaddition" are equivalently understood.

The polyaddition step can be carried out at a temperature below 95° C., preferably ranging from 60° C. to 90° C., more preferentially ranging from 65° C. to 80° C.

The polyaddition step can be carried out under anhydrous conditions, for example under a nitrogen atmosphere.

The polyaddition step can be carried out in amounts of polyisocyanate(s) and of polyol(s) such that the NCO/OH molar ratio is strictly greater than 1, for example of between 1.1 and 2.5, preferably between 1.1 and 2.2, preferentially between 1.2 and 2.0, for example between 1.20 and 1.80, advantageously between 1.20 and 1.50, in particular between 1.30 and 1.40, so as to advantageously obtain an NCO-terminated polyurethane.

In the context of the invention, and unless otherwise mentioned, the NCO/OH molar ratio corresponds to the molar ratio of the number of isocyanate (NCO) groups to the number of hydroxyl (OH) groups respectively borne by the polyisocyanates and the polyols used.

Catalyst A

The catalyst A is chosen from carboxylates based on bismuth and/or zinc.

In the context of the invention, the term "bismuth-based catalyst" is understood to mean a catalyst comprising bismuth. Such a catalyst can thus comprise other metal atoms in addition to bismuth, such as, for example, zinc.

The carboxylates may be those in which the carboxylic acid contains from 2 to 20 carbon atoms, preferably from 4 to 14 carbon atoms. Examples of carboxylic acids that may be mentioned include butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

The carboxylates may be monocarboxylates, dicarboxylates, tricarboxylates or mixtures thereof.

The catalyst A may be selected from the group consisting of zinc-based carboxylates, bismuth-based carboxylates, bismuth/zinc-based carboxylates, and mixtures thereof.

In particular, the catalyst A is chosen from bismuth 2-ethylhexanoate, zinc 2-ethylhexanoate, bismuth neodecanoate, zinc neodecanoate, bismuth/zinc neodecanoate, zinc/bismuth 2-ethylhexanoate, and mixtures thereof.

More preferably still, the catalyst A is chosen from bismuth-based carboxylates, and in particular those comprising only bismuth as metal.

Examples of bismuth carboxylates that may be mentioned include Borchi® KAT 320 (CAS number: 67874-71-9, bismuth 2-ethylhexanoate) and Borchi® KAT 315 (CAS number: 34364-26-6, bismuth neodecanoate), which are available from Borchers, K-KAT XK-651 (bismuth carboxylate) available from King Industries, K-KAT XC—B221 available from King Industries (bismuth tris(carboxylate), carboxylic acid), and Coscat 83 (bismuth tris(neodecanoate), neodecanoic acid) available from Vertellus.

Examples of zinc carboxylates that may be mentioned include Borchi® KAT 0761 (CAS number: 27253-29-8, zinc neodecanoate) available from Borchers, TIB KAT® 616 (zinc neodecanoate) available from TIB Chemicals, K-KAT XK-664 (zinc carboxylate) sold by King Industries.

Examples of bismuth/zinc carboxylates that may be mentioned include KAT 244 (bismuth/zinc 2-ethylhexanoate) and KAT 244 DS (bismuth/zinc neodecanoate) from Nitrochemie.

The total content of catalyst(s) A used in the polyaddition reaction can range from 0.001% to 1% by weight, preferably from 0.01% to 0.8% by weight, preferentially from 0.015% to 0.5% by weight relative to the total weight of the reagents used in the polyaddition reaction.

NCO-Terminated Polyurethane

The NCO-terminated polyurethane can have a number-average molecular mass ranging from 1000 g/mol to 50 000 g/mol, preferably from 1000 g/mol to 30 000 g/mol, preferentially from 5000 g/mol to 20 000 g/mol, advantageously from 15 000 g/mol to 25 000 g/mol.

The number-average molecular mass of the NCO-terminated polyurethanes can be measured by methods well known to a person skilled in the art, for example by size exclusion chromatography (or SEC) using standards of polyethylene glycol type.

The NCO-terminated polyurethane can have a polydispersity index ranging from 1.5 to 3.5, preferably from 2.0 to 3.3.

In the context of the invention, the polydispersity index is defined as the $M_w$ (weight-average molecular mass)/$M_n$ (number-average molecular mass) ratio of the polyurethane.

The NCO-terminated polyurethane may have a weight content of NCO groups ranging from 0.1% to 5% by weight, preferably from 0.1% to 1% by weight, relative to the total weight of the polyurethane.

Step a-2)

Step a-2) of the process according to the invention corresponds to the reaction of the NCO-terminated polymer obtained in step a-1) with an organosilane compound having at least one function that is reactive with the —NCO function of the NCO-terminated polymer.

Organosilane

The organosilane compound can be chosen from mercaptosilanes and aminosilanes, preferably aminosilanes.

The aminosilanes contain as an amine function as a function that is reactive with the —NCO function of the NCO-terminated polymer.

The aminosilane preferably has the following formula (I):

wherein:
R$^4$, which may be identical or different, each represent a linear or branched monovalent hydrocarbon radical comprising from 1 to 10 carbon atoms;
R$^5$, which may be identical or different, each represent an acyl radical, or a linear or branched monovalent hydrocarbon radical comprising from 1 to 10 carbon atoms, or two R$^5$ groups can form a ring;
p is an integer equal to 0, 1 or 2;

R$^3$ represents a linear or branched divalent alkylene radical comprising from 1 to 12 carbon atoms, preferably from 1 to 6 carbon atoms, R$^3$ preferentially representing methylene or n-propylene, and R$^6$ represents H, a linear or branched alkyl radical, an arylalkyl radical, a cyclic radical comprising from 1 to 20 carbon atoms, or a radical having the following formula (II):

[Chem 1]

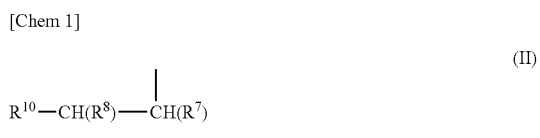

wherein:
R$^7$ and R$^8$ are, independently of one another, hydrogen or a radical chosen from the group consisting of —R$^9$, —COOR$^9$ and —CN;
the radical R$^{10}$ is hydrogen, or a radical chosen from the group consisting of —CH$_2$—COOR$^9$, —COOR$^9$, —CONHR$^9$, —CON(R$^9$)$_2$, —CN;
the radical R$^9$ being a hydrocarbon radical having from 1 to 20 carbon atoms optionally comprising at least one heteroatom.

In particular, the radical of formula (II) can be chosen from one of the following radicals:

[Chem 2]

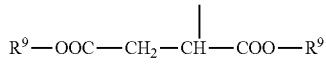

[Chem 3]

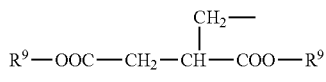

[Chem 4]

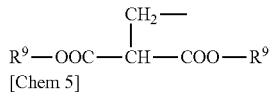

[Chem 5]

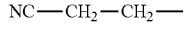

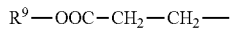

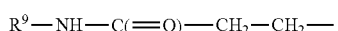

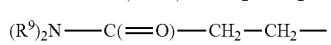

in which R$^9$ is as defined above.

According to a preferred embodiment, the aminosilane of formula (I) is that in which:
R$^4$, which may be identical or different, each represent a linear or branched alkyl group comprising from 1 to 10 carbon atoms, preferably from 1 to 5 carbon atoms;
R$^5$, which may be identical or different, each represent a linear or branched alkyl group comprising from 1 to 10 carbon atoms, preferably from 1 to 5 carbon atoms, or two R$^5$ groups can form a ring;
p is an integer equal to 0, 1 or 2, preferably p is 0;
R$^3$ represents a linear or branched divalent alkylene radical comprising from 1 to 12 carbon atoms, preferably from 1 to 6 carbon atoms, R$^3$ preferentially representing methylene or n-propylene, and $R^3$ represents a linear or branched alkyl radical comprising from 1 to 10 carbon atoms, preferably from 1 to 5 carbon atoms.

The aminosilanes of formula (I) above are preferably primary aminosilanes such as, for example, 3-aminopropyltrimethoxysilane, 3-aminopropyltriethoxysilane, 3-aminopropyldiethoxymethylsilane, 3-aminopropyldimethoxymethylsilane; secondary aminosilanes such as, for example, N-butyl-3-aminopropyltrimethoxysilane, N-butyl-3-aminopropyltriethoxysilane, N-phenyl-3-aminopropyltrimethoxysilane, N-phenyl-3-aminopropyltriethoxysilane; the reaction products of the Michael addition of primary aminosilanes such as for example 3-aminopropyltrimethoxysilane or 3-aminopropyldimethoxymethylsilane with Michael acceptors such as for example acrylonitrile, acrylic esters, acrylamides, maleic diesters, methylene malonate diesters, itaconic diesters.

Preferably, the aminosilane is N-butyl-3-aminopropyltrimethoxysilane.

The aminosilanes may be commercially available such as, for example, Dynasylan® 1189 sold by Evonik.

Conditions

Step a-2) may be carried out under anhydrous conditions.

Step a-2) may be carried out at a temperature below or equal to 95° C., preferably at a temperature ranging from 50° C. to 80° C.

Step a-2) may be carried out in a time ranging from 5 to 30 min, preferably from 10 to 20 min.

According to one embodiment, step a-2) is carried out in amounts of NCO-terminated polymer and of aminosilanes such that the NH/NCO molar ratio is between 0.90 and 1.00, preferably between 0.95 and 1.00.

In the context of the invention, and unless otherwise mentioned, the NH/NCO molar ratio corresponds to the molar ratio of the number of NH groups borne by the aminosilane to the number of isocyanate (NCO) groups born by the NCO-terminated polymer.

Alkoxysilane-Terminated Silyl Polymer P

According to one embodiment, the alkoxysilane-terminated silyl polymer P is a polymer comprising at least two groups of formula (III):

[Chem 6]

$$—Si(R^4)_3(OR^5)_{3-p} \quad (III)$$

wherein:
$R^4$, which may be identical or different, each represent a linear or branched monovalent hydrocarbon radical comprising from 1 to 10 carbon atoms;
$R^5$, which may be identical or different, each represent an acyl radical, or a linear or branched monovalent hydrocarbon radical comprising from 1 to 10 carbon atoms, or two $R^5$ groups can form a ring; and
p is an integer equal to 0, 1 or 2.

According to one embodiment, the silyl polymer P comprises at least one group of formula (III) above in which each occurrence of $R^5$ represents a linear or branched alkyl group comprising from 1 to 10 carbon atoms, preferably from 1 to 5 carbon atoms.

Preferably, the silyl polymer P comprises groups of formula (III) above chosen from trimethoxysilyl groups, triethoxysilyl groups, methyldimethoxysilyl groups, methyldiethoxysilyl groups, dimethylmethoxysilyl groups, and dimethylethoxysilyl groups.

More preferably still, the silyl polymer P comprises trimethoxysilyl groups.

Preferably, the silyl polymer P is a polyurethane.

The silyl polymer P may have a number-average molecular mass ranging from 500 to 100 000 g/mol, more preferably ranging from 700 to 50 000 g/mol, and preferentially from 1000 to 30 000 g/mol.

The number-average molecular mass of the polymers can be measured by methods well known to a person skilled in the art, for example by size exclusion chromatography using standards of polyethylene glycol type.

The silyl polymer P may have a viscosity at 23° C. of less than or equal to 350 000 mPa·s, preferably of less than or equal to 300 000 mPa·s, more preferentially ranging from 10 000 mPa·s to 300 000 mPa·s, in particular from 20 000 mPa·s to 250 000 mPa·s, advantageously from 20 000 to 120 000 mPa·s.

The viscosity can be measured using a Brookfield viscometer according to the standard ISO 2555 (1999). Typically, the measurement carried out at 23° C. can be performed using a Brookfield RVT viscometer with a spindle suited to the viscosity range and at a rotational speed of 20 revolutions per minute.

The silyl polymer P preferably has the formula (IV) below

[Chem 7]

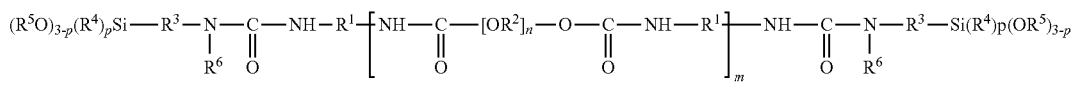

(IV)

wherein:
$R^1$ represents a divalent hydrocarbon radical comprising from 5 to 15 carbon atoms, which may be aromatic, aliphatic or cyclic,
$R^3$ represents a linear or branched divalent alkylene radical comprising from 1 to 6 carbon atoms, $R^3$ preferably representing methylene or n-propylene,
$R^2$ represents a linear or branched divalent alkylene radical comprising from 2 to 4 carbon atoms,
$R^4$ and $R^5$ are as defined above, preferably $R^4$ and $R^5$, which may be identical or different, each represent a linear or branched alkyl radical comprising from 1 to 4 carbon atoms, more preferentially still $R^4$ and $R^5$ representing methyl,
$R^6$ is as defined above, preferably $R^6$ represents a linear or branched alkyl radical comprising from 1 to 10 carbon atoms, preferably from 1 to 5 carbon atoms;
m is an integer other than zero,
n and m are such that the number-average molecular mass of the polymer of formula (III) ranges from 500 g/mol to 50 000 g/mol, preferably from 700 g/mol to 22 000 g/mol,
p is an integer equal to 0, 1 or 2, p preferably being 0 or 1.

Preferably, the $R^1$ radical is chosen from one of the following divalent radicals, the formulae of which below show the 2 free valencies:

a) the divalent radical derived from isophorone diisocyanate (IPDI):

[Chem 8]
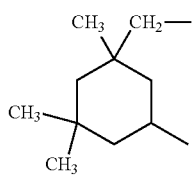

b) the divalent radical derived from 4,4'- and 2,4'-dicyclohexylmethane diisocyanate (HMDI):

[Chem 9]
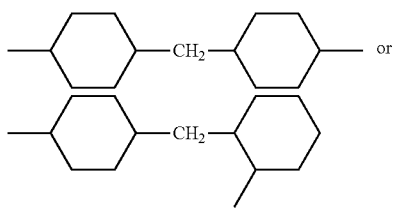

c) the radical derived from 2,4- and 2,6-toluene diisocyanate (TDI):

[Chem 10]
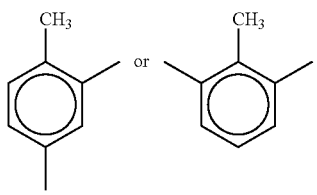

d) the radical derived from 4,4'- and 2,4'-diphenylmethane diisocyanate (MDI):

[Chem 11]
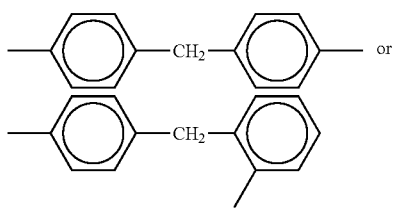

e) the radical derived from m-xylylene diisocyanate (m-XDI):

[Chem 12]
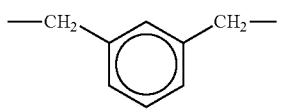

f) the radical derived from hexamethylene diisocyanate (HDI):

[Chem 13]
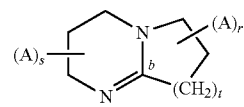
—(CH$_2$)$_6$—

Preferably, the R$^1$ radical is the divalent radical derived from isophorone diisocyanate.

Step b)

The process according to the invention comprises bringing the silyl polymer P obtained in step a) into contact with a catalytic crosslinking system B which is a mixture of zinc-based carboxylate(s) and cyclic amidine.

Catalytic System B

The catalytic system B is a crosslinking catalyst.

It makes it possible in particular to catalyze the crosslinking of the silyl polymer P in the presence of water or moisture. The water or moisture can be supplied by the surface of the substrate or the surrounding environment, in a natural manner (atmospheric humidity) or a controlled manner in contact with the crosslinkable composition according to the invention. This crosslinking results in particular in the creation of a three-dimensional network formed by the polymer chains connected together by siloxane-type bonds.

The cyclic aminidines can be chosen from those having the following formula (V):

[Chem 14]

(V)

wherein:
each A represents, independently of one another, a radical containing a nucleophilic non-protic group;
s represents an integer equal to or different from 0;
r represents an integer equal to or different from 0; and
t is a number equal to 0 or different from 0, preferably t is 1, 2, or 3, more preferentially still 3.

Preferably, in formula (V) above, s+r is 0, 1 or 2, preferentially 0 or 1.

Preferably, in formula (V) above, s is 0 and r is 0.

The group A can be chosen from the group consisting of tertiary phosphines, tertiary amino groups. The nitrogen atom of the amino groups or the phosphorus atom of the phosphines can be directly attached to a carbon atom of the cyclic structure.

Preferably, the group A has one of the following formulae: —(CH$_2$)$_x$N(R)$_2$ or —(CH$_2$)$_x$P(R)$_2$ wherein x ranges from 0 to 6, preferably 0, 1 or 2, and R is an alkyl group or a phenyl group, preferably an alkyl group containing from 2 to 4 carbon atoms.

According to a preferred embodiment, the cyclic amidines are chosen from 1,8-diazabicyclo[5.4.0]undec-7-ene (DBU) and 6-(dibutylamino)-1,8-diazabicyclo[5.4.0]undec-7-ene, and mixtures thereof.

The metal carboxylates may be those in which the carboxylic acid contains from 2 to 20 carbon atoms, preferably from 4 to 14 carbon atoms. Examples of carboxylic acids that may be mentioned include butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

The carboxylates may be monocarboxylates, dicarboxylates, tricarboxylates or mixtures thereof.

In particular, the zinc-based carboxylate is chosen from zinc 2-ethylhexanoate, zinc neodecanoate, and mixtures thereof.

Conditions

Step b) can be carried out at a temperature ranging from 5° C. to 80° C.

The process according to the invention may comprise additional steps to steps a) and b).

For example, the process may comprise one or more steps of adding additional compounds, such as, for example, at least one additive. Said additional compounds may be added before step b) and/or simultaneously with step b) and/or after step b).

The process may comprise a step c) of mixing the composition resulting from step b) or resulting from an optional step subsequent to step b).

The process according to the invention makes it possible to obtain crosslinkable compositions, from which low modulus sealants can be obtained, as described in detail below.

The process according to the invention is advantageously less toxic for mankind and the environment insofar as it is carried out in the absence of a tin-based catalyst, and in particular in the absence of an organotin catalyst.

Among the tin-based catalysts, mention may in particular be made of dioctyltin dilaurate (DOTL), or dibutyltin dilaurate (DBTL).

Composition

The present invention also relates to a crosslinkable composition comprising:
- at least one alkoxysilane-terminated silyl polymer P,
- at least one catalytic crosslinking system B which is a mixture of zinc-based carboxylate(s) and cyclic amidine,
- at least one catalyst A chosen from carboxylates based on bismuth and/or zinc,
- said composition not comprising a tin-based catalyst.

The present invention also relates to a crosslinkable composition obtained according to the process described in detail above, the composition comprising:
- at least one alkoxysilane-terminated silyl polymer P,
- at least one catalytic crosslinking system B which is a mixture of zinc-based carboxylate(s) and cyclic amidine,
- said composition not comprising a tin-based catalyst.

The characteristics of the catalyst A, of the crosslinking system B, of the silyl polymer P, and in particular the preferred characteristics, are in particular those defined above in the process according to the invention.

The polymer P is advantageously the polymer of formula (IV) as defined above.

According to one embodiment, the composition according to the invention comprises from 3% to 80% by weight, preferably from 5% to 60% by weight, preferentially from 5% to 50% by weight, advantageously from 10% to 50% by weight, for example from 10% to 40% by weight, of at least one alkoxysilane-terminated silyl polymer, preferably chosen from the polymers of abovementioned formulae (IV).

According to one embodiment, the composition according to the invention comprises from 0.001% to 0.5% by weight, preferentially from 0.005% to 0.20% by weight of catalyst A relative to the total weight of the composition.

According to one embodiment, the composition according to the invention comprises from 0.01% to 2% by weight, preferably from 0.1% to 1% by weight, preferentially from 0.2% to 0.5% by weight of the catalytic system B relative to the total weight of the composition.

According to one embodiment, the composition further comprises at least one additive chosen from plasticizers, solvents, pigments, adhesion promoters, moisture absorbers, UV stabilizers (or antioxidants), molecular sieves, glitter, fluorescent materials, rheological additives, fillers, and mixtures thereof.

The filler can be chosen from organic fillers, inorganic fillers and their mixtures.

Use may be made, as organic filler(s), of any organic filler(s) and in particular polymeric filler(s) typically used in the field of sealant compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may notably be made of hollow microspheres made of vinylidene chloride/acrylonitrile.

The mean particle size of the filler(s) which can be used is preferably less than or equal to 10 microns, more preferentially less than or equal to 3 microns, in order to prevent them from settling in the composition according to the invention during its storage.

The mean particle size is measured for a volume particle size distribution corresponding to 50% by volume of the sample of particles analyzed. When the particles are spherical, the mean particle size corresponds to the median diameter (D50 or Dv50), which corresponds to the diameter such that 50% of the particles by volume have a size which is smaller than said diameter. In the present patent application, this value is expressed in micrometers and determined according to the standard NF ISO 13320-1 (1999) by laser diffraction on an appliance of Malvern type.

Preferably, the filler is an inorganic filler.

Use may be made, as examples of inorganic filler(s), of any inorganic filler(s) typically used in the field of surface coating, adhesive or sealant compositions. The inorganic fillers can be provided in the form of particles of diverse geometry. They can, for example, be spherical or fibrous or exhibit an irregular shape.

According to one embodiment, the filler is chosen from sand, glass beads, glass, quartz, barite, alumina, mica, talc, carbonate fillers and mixtures thereof.

The sand which can be used in the present invention preferably has a particle size ranging from 0.1 to 400 μm, preferentially from 1 to 400 μm, more preferably from 10 to 350 μm, more preferably from 50 to 300 μm.

The glass beads which can be used in the present invention preferably have a particle size ranging from 0.1 to 400 μm, preferentially from 1 to 400 μm, more preferably from 10 to 350 μm, more preferably from 50 to 300 μm.

Preferably, the filler is a carbonate filler chosen from alkali metal or alkaline earth metal carbonates, such as, for example, calcium carbonate.

These fillers can be natural or treated, for example using an organic acid, such as stearic acid, or a mixture of organic acids consisting predominantly of stearic acid.

The total amount of filler can vary from 0.01% to 70% by weight, preferably from 20% to 65%, preferentially from 20% to 50%, advantageously from 25% to 40%, by weight, with respect to the total weight of the composition.

The abovementioned composition can comprise at least one plasticizing agent in a proportion of 5% to 30% by weight, preferably of 10% to 30% by weight, preferentially of 15% to 25% by weight, with respect to the total weight of said composition.

Mention may be made, as examples of plasticizing agent which can be used, of any plasticizing agent generally used in the field of adhesives, sealants and/or surface coatings, such as, for example, phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes and mixtures thereof.

Mention may be made, among the phthalates, for example, of diisononyl phthalate, diisobutyl phthalate, dioctyl phthalate, dicyclohexyl phthalate, diisooctyl phthalate, diisododecyl phthalate, dibenzyl phthalate, diisodecyl phthalate (for example sold by BASF under the name Palatinol™ DIDP) or benzyl butyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Mention may be made, among the pentaerythritol esters, for example, of pentaerythritol tetravalerate (for example available, under the name Pevalen™, from Perstorp).

Among the cyclohexanedicarboxylates, an example that may be mentioned is diisononyl 1,2-cyclohexanedicarboxylate (available, for example, under the name Hexamoll Dinch® from BASF).

As examples of rheology agent(s) that may be used, mention may be made of any rheology agent customarily used in the field of adhesive, sealant and/or surface coating compositions.

Preferably, use is made of one or more rheological agents chosen from thixotropic agents, and more preferably from:
  PVC plastisols, corresponding to a suspension of PVC in a plasticizing agent which is miscible with PVC, obtained in situ by heating to temperatures ranging from 60° C. to 80° C. These plastisols can be those described in particular in the publication *Polyurethane Sealants*, Robert M. Evans, ISBN 087762-998-6,
  fumed silica,
  urea derivatives resulting from the reaction of an aromatic diisocyanate monomer, such as 4,4'-MDI, with an aliphatic amine, such as butylamine. The preparation of such urea derivatives is described especially in patent application FR 1 591 172.
  micronized amide waxes, such as Crayvallac® SL, Crayvallac® SLX or Crayvallac® SLT, which are sold by Arkema.

The total content of rheological agent(s) which can be used can vary from 1% to 40% by weight, preferably from 5% to 30% by weight, more preferentially from 10% to 25% by weight, with respect to the total weight of the composition.

The solvent is preferably a solvent which is volatile at a temperature of 23° C. The volatile solvent can, for example, be chosen from alcohols which are volatile at 23° C., such as ethanol or isopropanol. The volatile solvent makes it possible, for example, to reduce the viscosity of the composition and make the composition easier to apply. The volatile character of the solvent makes it possible in particular for the joint, obtained after curing the composition, to no longer contain solvent. Thus, the solvent has, for example, no negative influence on the hardness of the joint.

When a solvent, in particular a volatile solvent, is present in the composition, its content is preferably less than or equal to 5% by weight, more preferably less than or equal to 3% by weight, relative to the total weight of the composition.

Preferably, the content of solvent(s) in the composition is between 0% and 5% by weight.

The pigments can be organic or inorganic pigments.

For example, the pigment is $TiO_2$, in particular Kronos® 2059 sold by Kronos.

The moisture absorber, if it is present, can, for example, be chosen from non-polymeric hydrolyzable alkoxysilane derivatives, with a molecular mass of less than 500 g/mol, preferably chosen from trimethoxysilane and triethoxysilane derivatives. Such an agent can typically extend the storage life of the composition during storage and transportation before it is used. Mention may be made, for example, of γ-methacryloxypropyltrimethoxysilane (for example available, under the trade name Silquest® A-174, from Momentive), methacryloxymethyltrimethoxysilane (for example available, under the name Geniosil® XL33, from Wacker), vinyltrimethoxysilane, isooctyltrimethoxysilane or phenyltrimethoxysilane.

When a moisture absorber is present in the composition, its content is preferably less than or equal to 3% by weight, more preferably less than or equal to 2% by weight, with respect to the total weight of the composition. When it is present, the moisture absorber can, for example, represent from 0.5% to 3% by weight or from 1% to 2% by weight, with respect to the total weight of the composition.

The composition may comprise an amount of from 0.1% to 3%, preferably from 0.1% to 3%, more preferentially still from 0.1% to 1% by weight, of at least one UV stabilizer or antioxidant. These compounds are typically introduced in order to protect the composition from degradation resulting from a reaction with oxygen which is liable to be formed by the action of heat or light. These compounds can include primary antioxidants which trap free radicals. The primary antioxidants can be used alone or in combination with other secondary antioxidants or UV stabilizers.

Mention may be made, for example, of Irganox® 1010, Irganox® B561, Irganox® 245, Irgafos® 168, Tinuvin® 328 or Tinuvin™ 770, which are sold by BASF.

According to one embodiment, the composition according to the invention comprises:
  from 3% to 80% by weight, preferably from 5% to 60% by weight, preferentially from 5% to 50% by weight, advantageously from 10% to 50%, for example from 10% to 40% by weight of silyl polymer P as defined above,
  from 0.001% to 0.5% by weight, preferably from 0.005% to 0.2% by weight, of catalyst A as defined above,
  from 0.01% to 2% by weight, preferably from 0.1% to 1% by weight, preferentially from 0.2% to 0.5% by weight, of the catalytic crosslinking system B relative to the total weight of the composition;
  from 0% to 50% by weight, in particular from 0.1% to 40% by weight, relative to the total weight of the composition of at least one additive chosen from plasticizers, solvents, pigments, adhesion promoters, moisture absorbers, UV stabilizers (or antioxidants), molecular sieves, glitter, fluorescent materials, rheological additives, fillers, and mixtures thereof.

The composition according to the invention can be in the one-component form, that is to say that all the components are packaged in one and the same compartment.

The composition is preferably ready-to-use, that is to say that the user (private individual or professional) can directly apply the composition in order to produce the joint, without having to carry out premixing.

The present invention also relates to a composition in the crosslinked state advantageously exhibiting the following properties:
- a modulus at 100% elongation at 23° C. of less than or equal to 0.40 MPa; and
- an elastic recovery of greater than or equal to 70%, preferably greater than or equal to 75%, and more preferentially still greater than or equal to 80%.

The composition in the crosslinked state is obtained by crosslinking the crosslinkable composition described in detail above.

The composition according to the invention is advantageously a low-modulus sealant composition, in particular classified as 25LM according to the EN 15651-1 (2012-11) and EN 15651-4 (2017-04) standard. According to this standard, the 25LM classification requires in particular:
- a modulus at 100% elongation at 23° C. of less than or equal to 0.40 MPa;
- a modulus at 100% elongation at −20° C. of less than or equal to 0.60 MPa; and
- an elastic recovery of greater than or equal to 70%.

The modulus at 100% elongation at 23° C. (or at −20° C.) is measured according to the test described in ISO 8339 (2005-06), on an aluminum or mortar substrate, with method A of ISO 8339 (2005-06) as a preconditioning method.

The elastic recovery is measured at 100% elongation and 23° C. according to the ISO 7389 (2004-04) standard, on an aluminum or mortar substrate, according to the pre-conditioning method A of ISO 7389 (2004-05).

The composition according to the invention is advantageously a sealant composition, in particular an elastic sealant composition.

The composition according to the invention is advantageously a low-modulus sealant composition.

The composition according to the invention advantageously exhibits a good compromise between mechanical properties and adhesion properties, while being more human friendly and environmentally friendly. The composition according to the invention is advantageously of use in the construction field.

Uses

The present invention also relates to the use of a composition as defined above as adhesive, sealant or coating, preferably as sealant, for example as construction sealant.

The composition can be used for applications on concrete, mortar, brick, glass, metal, wood, plastic.

The composition is preferably applied at a temperature ranging from 5° C. to 50° C., and can crosslink under these conditions.

The composition can in particular be used to form sealing and expansion joints in buildings, in particular between concrete/concrete substrates.

In the context of the invention, the term "between x and y" or "ranging from x to y" means a range in which the limits x and y are included. For example, the range "between 1% and 3%" includes in particular the values 1% and 3%.

The following examples illustrate the invention without, however, limiting it.

EXPERIMENTAL SECTION

Acclaim® 12200: polyether polyol with a number-average molecular mass in the vicinity of 11 335 g/mol, sold by Covestro;
Palatinol N (sold by BASF): diisononyl phthalate (plasticizer);
Exxsol D 100: sold by Exxson: C12-C15 aliphatic hydrocarbon, (solvent);
Additive TI: (sold by Borcher): para-toluenesulfonyl isocyanate (desiccant);
IPDI: sold by Evonik: isophorone diisocyanate;
Dynasylan® 1189: sold by Evonik: N-butyl-3-aminopropyltrimethoxysilane;
Dynasylan® VTMO: vinyltrimethoxysilane moisture absorber, available from Evonik;
Irganox 1076: sold by BASF (antioxidant);
Tinuvin 765: sold by BASF (HALS-type UV stabilizer);
Crayvallac Super: sold by Arkema, polyamide wax (thickener);
Omyacarb 2T AV: sold by Omya, calcium carbonate (filler);
$TiO_2$: sold by Kronos, titanium oxide (colorant);
Dynasylan® 1146: sold by Evonik, oligomeric aminosilane (adhesion promoter);
TIB KAT 244 DS: bismuth/zinc neodecanoate sold by Nitrochemie (catalyst);
K-KAT XK-664: zinc carboxylate sold by King Industry (catalyst);
K-KAT XK-651: bismuth carboxylate, sold by King Industry (catalyst);
K-KAT 670: zinc carboxylate/DBU mixture sold by King Industry (catalyst).

Example 1: Preparation of Silyl Polymers P1 to P3

The following polymers were prepared according to the following procedure, under anhydrous conditions:

Acclaim 12200 (having an OHN of 9 to 11 mg KOH/g, and a number-average molecular mass of around 12 000) then the additive Ti are introduced into a reactor and the medium is heated to 60-65° C. Next, the IPDI is introduced, mixed for 10 min and then the catalyst is introduced. The mixture is then heated to 70° C. for one hour with stirring. The NCO number is then checked; if the theoretical NCO number is not reached, the reaction time is extended by as many periods of 15 minutes as necessary. When the theoretical NCO index is reached, the Dynasilane 1189 is added, and the mixture is stirred for 10 minutes. The reactor is then placed in cooling mode and the VTMO and also the Exxsol D 100 and the DINP are added; the mixture is then kept under stirring for 20 minutes.

The amounts shown in the following table are expressed as percentages by weight with respect to the total weight of the polyurethane composition.

TABLE 1

|  | Silyl polymer P1 | Silyl polymer P2 | Silyl polymer P3 |
| --- | --- | --- | --- |
| ACCLAIM 12 200 | 78 | 78 | 78 |
| IPDI | 2 | 2 | 2 |
| ADDITIVE TI | 0.2 | 0.2 | 0.2 |

TABLE 1-continued

|  | Silyl polymer P1 | Silyl polymer P2 | Silyl polymer P3 |
|---|---|---|---|
| CATALYST | 0.05% KKat XK 664 | 0.035% cat KAT 244DS | 0.015% XK 651 |
| DYNASILANE 1189 | 1.2 | 1.2 | 1.2 |
| VTMO | 0.5 | 0.5 | 0.5 |
| EXXSOL D 100 | 9 | 9 | 9 |
| DINP | 9 | 9 | 9 |
| NCO/OH molar ratio | 1.37 | 1.37 | 1.37 |
| wt % of final NCO | 0.26 | 0.25 | 0.26 |
| Viscosity of the polymer (23° C., Brookfield, in mPa · s) | 108000 | 186000 | 184000 |

Example 2: Preparation of the Sealant Composition C1

Composition C1 was prepared according to the following procedure: mixing the silyl polymer, DINP, Tinuvin 765 and half of the Dynasilane VTMO for 5 minutes at low speed. Next, the powder components were added: Irganox 1076, TiO2, Crayvallac Super and Omyacarb 2T AV. The reaction mixture was stirred at high speed under vacuum until it reached 75° C. After 15 minutes at 75° C., the medium was cooled. Then, the following compounds were added: Exxsol D100, second half of the Dynasilane VTMO, Dynasilane 1146 and KKAT 670. The medium was stirred under vacuum at low speed for 15 minutes.

The amounts shown in the following table are expressed as weight percentages relative to the total weight of the sealant composition.

TABLE 2

|  | C1 |
|---|---|
| DINP | 14 |
| Tinuvin ® 765 | 0.3 |
| IRGANOX 1076 | 0.3 |
| CRAYVALLAC SUPER | 4.5 |
| OMYACARB 2T AV | 40.3 |
| Silyl polymer P1 | 33 |
| TiO$_2$ | 2.5 |
| Exxsol D 100 | 2 |
| DYNASYLAN ® 1146 | 0.7 |
| DYNASYLAN ® VTMO | 1.9 |
| K-KAT 670 (catalyst B) | 0.5 |

Example 3: Properties of the Crosslinked Composition

The properties obtained for the sealant composition C1 are summarized in the following table:

TABLE 3

|  | C1 |
|---|---|
| Skinning time (in min) | 120 |
| Elongation at break (%) on aluminum substrate | 590 |
| Modulus at maximum elongation at break (MPa) on aluminum substrate | 0.52 |
| Modulus at 100% elongation at 23° C. (aluminum substrate) (in MPa) | 0.25 |
| Elastic recovery (aluminum substrate) (in %) | 84 |
| Elongation at break (%) on mortar substrate | 360 |
| Modulus at maximum elongation at break (MPa) on mortar substrate | 0.34 |
| Modulus at 100% elongation at 23° C. (mortar substrate) (in MPa) | 0.24 |

The skinning time was measured in a controlled atmosphere at a temperature of 20° C. and a relative humidity of approximately 50%.

The composition was applied using a wooden spatula and in the form of a thin film with a thickness of approximately 0.5 mm to a glass slide with a length of 76 mm and a width of 26 mm. Immediately after the application of said film, a stopwatch was started and it was examined every minute, using gentle pressure with the finger, if the film is dry or if a composition residue is transferred onto the finger. The skinning time is the time at the end of which the composition film is dry and for which there is no longer any transfer of adhesive residue onto the finger. The result is expressed in minutes.

The measurement of the tensile strength and the elongation at break by tensile testing was carried out according to the protocol described below: the principle of the measurement consists in stretching, in a tensile-testing machine, the movable jaw of which moves at a constant speed equal to 5.5 mm/minute, a standard test specimen consisting of the crosslinked composition and in recording applied to a standardized substrate of anodized aluminum or cement mortar type, and of measuring the stress at 100% elongation (in MPa) and also the maximum stress (in MPa) and also the elongation of the test specimen (in %) at the moment when the test specimen breaks. The standard test specimen is referred to as an "H test specimen"; it consists of 2 substrates, the surface area of which is 75×12.5 mm and a central joint applied to these 2 substrates and consisting of the material to be tested, the dimensions of which are 50×12.5×12.5 mm.

The modulus at 100% elongation at 23° C. was determined according to the standard ISO 8339 (2005-06), on an aluminum or mortar substrate, with preconditioning carried out according to method A of ISO 8339 (2005-06).

The elastic recovery at 100% elongation at 23° C. was determined according to the standard ISO 7389 (2004-04), on an aluminum or mortar substrate, with preconditioning carried out according to method A of ISO 7389 (2004-04).

The results of the table show that the composition according to the invention C1 advantageously results in a low modulus elastic sealant, insofar as:
the modulus at 100% elongation at 23° C. is less than or equal to 0.40 MPa; and
the elastic recovery at 23° C. is greater than or equal to 70%.

The invention claimed is:
1. A process for preparing a crosslinkable composition comprising at least one alkoxysilane-terminated silyl polymer P, and at least one catalytic system B, said process comprising the following steps:
a) preparing an alkoxysilane-terminated silyl polymer P comprising:

a-1) a polyaddition reaction between a composition of polyol(s) and a composition of polyisocyanate(s), in the presence of a catalyst A selected from the group consisting of carboxylates based on bismuth and zinc or carboxylates based on zinc, in order to prepare an NCO-terminated polymer;

a-2) a reaction of the NCO-terminated polymer obtained in step a-1) with an aminosilane compound having at least one function that is reactive with the —NCO function of the NCO-terminated polymer; and b) bringing the silyl polymer P obtained in step a) into contact with a catalytic crosslinking system B, which is a mixture of zinc-based carboxylate(s) and cyclic amidine, said process being carried out in the absence of a tin-based catalyst.

2. The process as claimed in claim 1, wherein the carboxylates based on bismuth and/or zinc comprise those in which the carboxylic acid contains from 2 to 20 carbon atoms.

3. The process as claimed in claim 2, wherein the carboxylic acid is selected from the group consisting of butyric acid, isobutyric acid, caproic acid, caprylic acid, 2-ethylhexanoic acid, capric acid, lauric acid, myristic acid, palmitic acid, stearic acid, isostearic acid, abietic acid, neodecanoic acid, 2,2,3,5-tetramethylhexanoic acid, 2,4-dimethyl-2-isopropylpentanoic acid, 2,5-dimethyl-2-ethylhexanoic acid, 2,2-dimethyloctanoic acid, 2,2-diethylhexanoic acid and arachidic acid.

4. The process as claimed in claim 1, wherein the catalyst A is selected from the group consisting of bismuth 2-ethylhexanoate, zinc 2-ethylhexanoate, bismuth neodecanoate, zinc neodecanoate, bismuth/zinc neodecanoate, zinc/bismuth 2-ethylhexanoate, and mixtures thereof.

5. The process as claimed in claim 1, wherein the NCO-terminated polymer has a weight content of NCO groups ranging from 0.1% to 5% by weight, relative to the total weight of the polymer.

6. The process as claimed in claim 1, wherein the aminosilane compound has the following formula (I);

[Chem 15]

$$(R^5O)_{3-p}(R^4)_p Si\text{—}R^3\text{—}NH\text{—}R^6 \quad (I)$$

wherein:
R$^4$, which may be identical or different, each represent a linear or branched monovalent hydrocarbon radical comprising from 1 to 10 carbon atoms;
R$^5$, which may be identical or different, each represent an acyl radical, or a linear or branched monovalent hydrocarbon radical comprising from 1 to 10 carbon atoms, or two R$^5$ groups can form a ring;
p is an integer equal to 0, 1 or 2;
R$^3$ represents a linear or branched divalent alkylene radical comprising from 1 to 12 carbon atoms, and R$^6$ represents H, a linear or branched alkyl radical, an arylalkyl radical, a cyclic radical comprising from 1 to 20 carbon atoms, or a radical having the following formula (II):

[Chem 16]

wherein:
R$^7$ and R$^8$ are, independently of one another, hydrogen or a radical chosen from the group consisting of —R$^9$, —COOR$^9$ and —CN;
the radical R$^{10}$ is hydrogen, or a radical chosen from the group consisting of —CH$_2$—COOR$^9$, —COOR$^9$, —CONHR$^9$, —CON(R$^9$)$_2$, —CN; and
the radical R$^9$ is a hydrocarbon radical having from 1 to 20 carbon atoms optionally comprising at least one heteroatom.

7. The process as claimed in claim 1, wherein the aminosilane compound is selected from the group consisting of primary aminosilanes; secondary aminosilanes; and the reaction products of the Michael addition of primary aminosilanes with Michael acceptors.

8. The process as claimed in claim 1, wherein the alkoxysilane-terminated silyl polymer P is a polymer comprising at least two groups of formula (III):

[Chem 17]

wherein:
R$^4$, which may be identical or different, each represent a linear or branched monovalent hydrocarbon radical comprising from 1 to 10 carbon atoms;
R$^5$, which may be identical or different, each represent an acyl radical, or a linear or branched monovalent hydrocarbon radical comprising from 1 to 10 carbon atoms; or two R$^5$ groups can form a ring; and
p is an integer equal to 0, 1 or 2.

9. The process as claimed in claim 8, wherein the silyl polymer P comprises groups of formula (III) selected from the group consisting of trimethoxysilyl groups, triethoxysilyl groups, methyldimethoxysilyl groups, methyldiethoxysilyl groups, dimethylmethoxysilyl groups, and dimethylethoxysilyl groups.

10. The process as claimed in claim 1, wherein the silyl polymer P has a viscosity at 23° C. of less than or equal to 350 000 mPa·s, the viscosity being measured using a Brookfield viscometer according to the ISO 2555 (1999) standard.

11. The process as claimed in claim 1, wherein the silyl polymer P has the formula (IV) below

[Chem 18]

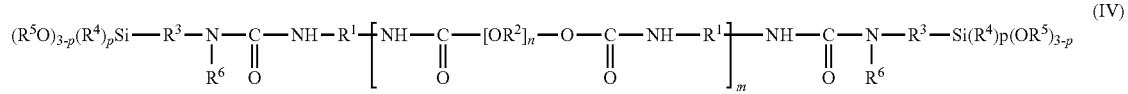

wherein:
R$^1$ represents a divalent hydrocarbon radical comprising from 5 to 15 carbon atoms, which may be aromatic, aliphatic or cyclic,
R$^3$ represents a linear or branched divalent alkylene radical comprising from 1 to 6 carbon atoms,
R$^2$ represents a linear or branched divalent alkylene radical comprising from 2 to 4 carbon atoms,
R$^4$ and R$^5$, which may be identical or different, each represent a linear or branched alkyl radical comprising from 1 to 4 carbon atoms,
R$^6$ represents a linear or branched alkyl radical comprising from 1 to 10 carbon atoms,
n and m are such that the number-average molecular mass of the polymer of formula (III) ranges from 500 g/mol to 50 000 g/mol, the number-average molecular mass being measured by size exclusion chromatography using standards of polyethylene glycol type, and
p is an integer equal to 0, 1 or 2.

12. The process as claimed in claim 1, wherein the cyclic aminidines are chosen from those having the following formula (V):

[Chem 19]

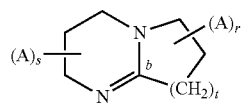

(V)

wherein:
each A represents, independently of one another, a radical containing a nucleophilic non-protic group;
s represents an integer equal to or different from 0;
r represents an integer equal to or different from 0; and
t is a number equal to 0 or different from 0.

13. The process as claimed in claim 1, wherein the cyclic amidines are chosen from 1,8-diazabicyclo[5.4.0]undec-7-ene (DBU) and 6-(dibutylamino)-1,8-diazabicyclo[5.4.0]undec-7-ene, and mixtures thereof.

14. A crosslinkable composition comprising:
at least one alkoxysilane-terminated silyl polymer P;
at least one catalytic crosslinking system B which is a mixture of zinc-based carboxylate(s) and cyclic amidine; and
at least one aminosilane compound;
said composition not comprising a tin-based catalyst; and
said composition being obtained by the preparation process as claimed in claim 1.

15. The composition as claimed in claim 14, comprising from 3% to 80% by weight of at least one alkoxysilane-terminated silyl polymer.

16. The composition as claimed in claim 14, comprising from 0.01% to 2% by weight of the catalytic system B relative to the total weight of the composition.

17. A composition in the crosslinked state, obtained by crosslinking the crosslinkable composition as claimed in claim 14, and having the following characteristics:
a modulus at 100% elongation at 23° C. of less than or equal to 0.40 MPa, the modulus at 100% elongation at 23° C. being measured on an aluminum or mortar substrate, with method A of ISO 8339 (2005-06); and
an elastic recovery of greater than or equal to 70%, the elastic recovery being measured on an aluminum or mortar substrate, according to the pre-conditioning method A of ISO 7389 (2004-05).

* * * * *